United States Patent [19]

Agreda et al.

[11] Patent Number: 5,258,491
[45] Date of Patent: Nov. 2, 1993

US005258491A

[54] PROCESS FOR PREPARATION OF A POLYETHERKETONE

[75] Inventors: Victor H. Agreda, Kingsport, Tenn.; Eddie J. Eckart, Batesville, Ark.; Tim J. Frederick, Kingsport; J. Adrian Hawkins, Johnson City, both of Tenn.

[73] Assignee: Eastman Kodak Company, Rochester, N.Y.

[21] Appl. No.: 941,282

[22] Filed: Sep. 4, 1992

[51] Int. Cl.$^5$ .................... C08F 6/00; C08G 8/02
[52] U.S. Cl. .................... 528/495; 528/125; 528/176
[58] Field of Search ............ 528/176, 125, 495

[56] References Cited

U.S. PATENT DOCUMENTS

| | | | |
|---|---|---|---|
| 3,065,205 | 11/1962 | Bonner | 528/180 |
| 3,441,538 | 4/1969 | Marks | 528/86 |
| 3,442,857 | 5/1969 | Thornton | 528/86 |
| 3,516,966 | 6/1970 | Berr | 528/194 |
| 3,637,592 | 1/1972 | Berr | 528/194 |
| 4,182,852 | 1/1980 | Shiga et al. | 528/494 |
| 4,195,145 | 3/1980 | Shiga et al. | 526/137 |
| 4,720,537 | 1/1988 | Brugel | 528/125 |
| 4,816,556 | 3/1989 | Gay et al. | 528/176 |

Primary Examiner—John Kight, III
Assistant Examiner—T. Mosley
Attorney, Agent, or Firm—Charles R. Martin; William P. Heath, Jr.

[57] ABSTRACT

Disclosed is a process for removing the Lewis acid catalyst, polymerization solvent and byproducts, such as ketals, from a polyetherketone comprising (A) introducing into an extraction zone a Lewis acid polymerization catalyst, a polymerization solvent and a polyetherketone, (B) passing an alcohol through the extraction zone to remove a majority of the Lewis acid catalyst and the polymerization solvent, (C) passing water through the extraction zone to remove a majority of the alcohol, (D) contacting the polyetherketone with an aqueous acid solution, (E) passing water through the extraction zone to remove a majority of the acid, (F) passing steam through the extraction zone, and (G) subjecting the polyetherketone to a reduced pressure.

5 Claims, No Drawings

PROCESS FOR PREPARATION OF A POLYETHERKETONE

This invention relates to a process for removing the Lewis acid catalyst and solvent from a polyetherketone.

Polyetherketone polymers are well known in the art and are disclosed in U.S. Pat. Nos. 3,516,966, 3,637,592, 3,441,538 and 4,816,556. Polyetherketones are typically prepared by reacting an aromatic ether, such as diphenyl ether, with one of more phthaloyl chlorides, such as tere- and isophthaloyl chloride, in the presence of a solvent, such as ortho dichlorobenzene, and a Lewis acid catalyst, such as aluminum chloride.

Polyetherketone polymers are often prepared into useful objects under extreme heat conditions. For example, manufacturing steps can include one or more melt cycles lasting several minutes duration and at temperatures exceeding 300° C. In order for these polymers to be suitable for manufacturing conditions of this nature the polymers must be substantially free of the Lewis acid catalyst, solvent, and byproducts such as ketals.

Several methods are known in the art to remove the catalyst and solvent from polyetherketones. U.S. Pat. Nos. 4,816,556, 3,637,592, 3,516,966, 3,442,857, 3,441,538, and 3,065,205 describe repeated batch washes or extractions with various combinations of pyridine, methanol, water, acetone and hydrochloric acid solutions. Batch extractions with refluxing acetone or pyridine are also described.

Removal of a Lewis Acid catalyst from polypropylene by mechanically agitated alcohol extraction is known in the art and is described in U.S. Pat. Nos. 4,195,145 and 4,182,852.

Although some of these methods are relatively effective, these methods do not result in removal of a sufficient amount of catalyst, solvent, and byproduct ketals to make the polyetherketone useful for many manufacturing applications. Byproduct ketals reduce the thermal stability of polyetherketone polymers through prolonged exposure to decomplexing agents/solvents such as methanol.

Applicants believe the difficulties in removing the catalyst, solvent, and ketals result from the porous character of the polyetherketone. Applicants theorize that the porosity causes the solid polymer to retain several times its own weight in catalyst and solvent and further that the system of voids is a "closed" system wherein the voids do not connect with each other.

Applicants have now invented a process which removes a significantly greater amount of the catalyst, solvent and other impurities and reverses the formation of ketals from polyetherketones better than the methods of the prior art. In summary, after preparation of a polyetherketone which contains a Lewis acid catalyst and a solvent the process of this invention is practiced by the conducting the following steps.

(A) The polyetherketone which contains a Lewis acid polymerization catalyst, a polymerization solvent, and byproduct ketals is introduced into an extraction zone.

(B) An alcohol is passed through the extraction zone to remove from the extraction zone greater than 80 weight percent of the Lewis acid catalyst and greater than 80 weight percent of the polymerization solvent.

(C) Water is passed through the extraction zone to remove greater than 80 weight percent of the alcohol from the extraction zone.

(D) The polyetherketone is contacted within the extraction zone with an acid aqueous solution to reverse the ketal forming reactions and restore the thermal stability of the polymer.

(E) Water is passed through the extraction zone to remove greater than 90 weight percent of the acid from the extraction zone.

(F) Steam is passed through the extraction zone to remove greater than 30 weight percent of the water.

(G) The pressure within the extraction zone is reduced.

The polyetherketones that are useful in this invention contain a Lewis acid catalyst and a polymerization solvent resulting from the method of their preparation and correspond to the structure

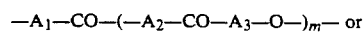

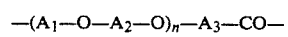

wherein m is 1, 2 or 3, n is 1, 2 or 3, and $A_1$, $A_2$ and $A_3$ are a divalent radical derived from a substituted or unsubstituted aromatic compound.

As described previously, these polymers and the method of their preparation are well known in the art.

In a preferred embodiment, $A_1$, $A_2$ and $A_3$ correspond to the structure

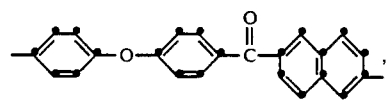

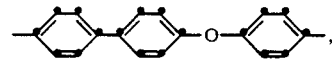

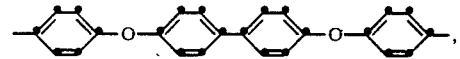

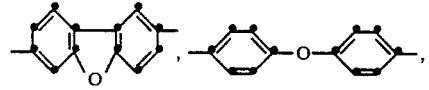

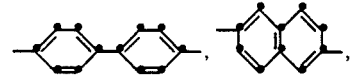

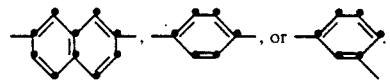

In a particularly preferred embodiment, the polyetherketone corresponds to the structure

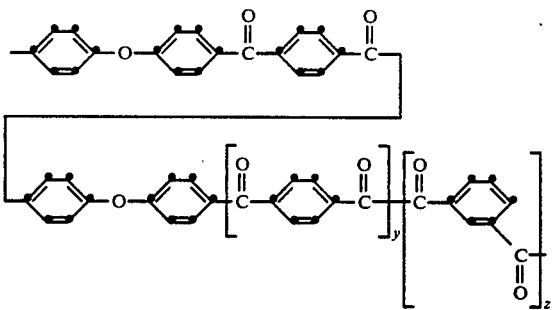

In the above structure, the ratio of y:z is broadly in the range of 90:10 to 25:75. In a more preferred embodiment, the ratio of y:z is in the range of 80:20 to 60:40.

In accordance with this invention the polyetherketone contains a Lewis acid catalyst of the kind well known in the art for preparation of polyetherketones. Preferably the catalyst is selected from the group consisting of aluminum chloride, boron triflouride, antimony pentaflouride and ferric chloride. In a preferred embodiment, the catalyst is aluminum chloride.

In accordance with this invention the polyetherketone also contains a polymerization solvent of the kind well known in the art. Examples of suitable solvents include nitrobenzene, tetrachloroethane, carbon disulfide, dichloro difluoromethane, methylene chloride, 1,2-dichloroethane, 1,2,4-trichlorobenzene, 1-difluorobenzene, trichloromethane and p-dichlorobenzene. Preferably, the solvent is o-dichlorobenzene.

The inherent viscosity of the polyetherketone is at least 0.2 and more preferably is at least 0.5 or higher.

The inherent viscosity is measured at 25° C. using 0.05 weight percent polyetherketone in sulfuric acid.

In the first step of the process the polyetherketone which contains the Lewis acid catalyst and the polymerization solvent is introduced into an extraction zone wherein the subsequent steps are conducted.

The polymer is typically in a granular form composed of particles ranging from about 0.1 mm in diameter, or smaller, to about 3 mm in diameter or larger. Because the polyetherketone is granular in character, the polyetherketone containing the Lewis acid catalyst and the polymerization solvent can be mixed with a liquid such as an alcohol to form a slurry and the slurry can be pumped into the extraction zone.

The extraction zone can comprise equipment well known in the art for polymer extraction. For example, in a preferred embodiment an ordinary cylindrical vessel equipped with a conical bottom, suitable piping and a means to reduce the pressure can be used.

In the second step of the process an alcohol is passed through the extraction zone to remove most of the Lewis acid catalyst and polymerization solvent.

The alcohol can comprise any alcohol which has some solubility in water and is liquid at room temperature. Examples includes methanol, ethanol, n-propanol and isopropanol, n-butanol, isobutanol, s-butanol, n-pentanol, isopentanol, t-pentanol and amyl alcohol. Preferably the alcohol is selected from the group consisting of methanol, ethanol, n-propanol and isopropanol. Most preferably the alcohol is methanol.

Broadly, at least 80% of the Lewis acid catalyst and 80% of the solvent are removed in this step. In a preferred embodiment, the amount of Lewis acid catalyst and polymerization solvent removed is greater than 98 percent and in a more preferred embodiment the amount of Lewis acid catalyst and polymerization solvent removed is greater than 99.5 percent.

The alcohol can be passed through the extraction zone in any manner suitable for practicing the invention. The preferred point of addition of the alcohol depends upon the relative density of the alcohol which becomes contaminated with the catalyst and polymerization solvent. Since the alcohol usually has a lower density than the Lewis acid contaminated alcohol the preferred direction for the alcohol extraction is to pass the alcohol downward under the influence of gravity and remove the Lewis acid contaminated alcohol from the bottom. If the alcohol has a higher density than the Lewis acid contaminated alcohol, it is desirable to add the alcohol to the bottom of the bed and removed the Lewis acid contaminated alcohol from the top. In a particularly preferred embodiment wherein the alcohol is methanol, the methanol is introduced into the upper portion of a cylindrical vessel using a spray nozzle and allowed to flow through the polymer under the influence of gravity. In either case, the liquid level in the bed is preferably maintained above the level of solids in the bed.

The rate at which the alcohol is passed through the extraction zone can be expressed as the superficial velocity in the bed which is defined as the volumetric flow rate of solvent into the bed divided by the cross sectional area of the bed which is perpendicular to alcohol flow. The superficial velocity of the alcohol is broadly 0.5 to 10 centimeters per minute, preferably 1 to 3 centimeter per minute. The temperature within the extraction zone can be 0° C. to 100° C., preferably 15° to 30° C. The amount of alcohol is 0.8 to 4 times the bed volume, preferably 1.1 to 2.0 times the bed volume.

In the third step of the process water is passed through the extraction zone to remove most of the alcohol from the extraction zone.

The water can be passed through the extraction zone is any matter suitable for practicing the invention. In a preferred embodiment, the water is passed through the extraction zone in a direction opposite to the direction the alcohol was passed through the extraction zone. Thus in the preferred embodiment wherein the alcohol is methanol which is passed through the extraction zone from top to bottom, the water is pumped through the extraction zone from bottom to top.

Broadly, the amount of alcohol removed in this step is greater than 80 percent. Preferably, the amount of the alcohol removed is greater than 95 percent and most preferably greater than 99 percent.

In the fourth step of the process the polyetherketone is contacted within the extraction zone with an acid aqueous solution.

The acid used to prepare the solution can be any suitable water soluble acid such as sulfuric, phosphoric, hydrochloric, hydrobromic, hydroiodic, methanesulfonic, ethanesulfonic, formic, acetic or propionic. Hydrochloric acid is preferred due to its strength, ease of removal from the polyetherketone polymer with water, cost, and the fact that it is a by-product of hydrolysis of many of the commonly used Friedel-Crafts Lewis acid polymerization catalysts.etc.

The Ph of the solution is broadly less than 6 and in a preferred embodiment is less than 3.

The polymer is contacted with the acid aqueous solution for at least 30 minutes, preferably at least 120 minutes.

The acid aqueous solution can be contacted with the polymer by any method known in the art but in a preferred embodiment the acid solution is flowed through the extraction zone under the influence of gravity.

In the fifth step of the process water is passed through the extraction zone.

The water can be contacted with the polymer by any method known in the art but in a preferred embodiment the water is flowed through the extraction zone under the influence of gravity.

Broadly, the amount of acid removed from the polymer is greater than 90 weight percent and preferably is greater than 98 percent.

In the sixth step of the process steam is passed through the extraction zone.

The steam can be passed through the extraction zone by any method known in the art but in a preferred embodiment the steam is introduced to the top of the extraction zone at a rate which keeps the pressure in the extraction vessel below about 10 psig.

The amount of steam is broadly from 0.8 to 1.7 pounds of steam per pound of polyetherketone and preferably is about 1.25 pounds of steam per pound of polyetherketone.

The time the steam is passed through the extraction zone is at least 45 minutes and is preferably at least 70 minutes.

The amount of water removed during this step is at least 30 weight percent and preferably is at least 35 weight percent.

The use of steam in this step (instead of, for example air or nitrogen) provides several advantages. Steam does not require the use of compressors, it does not generate environmental emissions, it does not require external heating sources, eliminates explosion hazards, causes the polymer particles to shrink thereby enhancing the dewatering of the polymer, it provides a simple and effective way to control product temperature through control of the final pressure in the bed, it enhances the removal of trace contaminants, and eliminates corrosion concerns.

In the last step of the process the polyetherketone within the extraction zone is subjected to a reduced pressure.

The pressure can be any pressure which is lower than ambient and is suitable for practicing the invention. The specific pressure is not a critical feature of the process. In a preferred embodiment the pressure is about 200 Torr.

The time the polymer is subjected to the reduced pressure is at least 2 hours and preferably is at least 3 hours.

The primary purpose of applying the vacuum during the sixth step is to cool the product for unloading by flashing the hot water in the polymer. The vacuum treatment has the additional beneficial effects of further dewatering, and further removal of trace impurities and solvents. The amount of water removed during the vacuum cycle is between 2 and 5 percent of the weight of water present at the start of the vacuum cycle.

The step wherein steam is passed through the extraction zone and the step wherein the pressure is reduced are particularly significant aspects of the process because the combination of these two steps produces a dry and clean polymer.

The process of this invention can be further understood by considering the following example of the practice of a preferred embodiment of this invention.

A system was constructed which consists of a 11,356 liter extractor. The extractor contains a cylindrical section of 1.95 meters diameter and 2.81 meters length. The lower section consists of a cone reducing the diameter from 2.81 meters to 0.50 meters at an angle of 70 degrees from horizontal. A spray nozzle was fitted inside the top of the extractor as well as a screen-covered dip pipe. A filter screen was placed at the bottom to support the polyetherketone while allowing liquid to be discharged from the vessel. The extractor was fitted with a steam jet to reduce the pressure.

A slurry of polyetherketone in o-dichlorobenzene was produced using the reaction disclosed in U.S. Pat. No. 4,816,556 with aluminum chloride used as the Lewis catalyst. The process described was followed through the addition of cooled methanol. The slurry of polyetherketone in o-dichlorobenzene was drained into the extractor. A total of 13,107 kilograms of slurry was charged. The amount of dry solid was determined to be 533 kilograms. A total of 7367 kilograms of liquid was removed through the bottom screen and the screen-covered dip pipe. Methanol was added to the bottom of extractor until a total of 2604 kilograms had been added. The extractor was sparged with nitrogen into the bottom to mix the bed and provide a uniform polymer bed for extraction. Liquid was removed again to adjust the liquid level inside the extractor so that it was just above the level of the solids. The extraction was started by spraying methanol onto the top of the bed while removing liquid through the filter screen at the bottom. The methanol flow rate was adjusted as necessary to keep the liquid level just above the bed of solids, but was not allowed to exceed 62 liters per minute. The methanol spray was stopped after 188 minutes. A total of 6407 kilograms of methanol had been added, including both the addition to the bottom and the spray into the top, which is 12 kilograms of methanol per kilogram of dry solid polymer. Methanol was drained from the bottom of the extractor through the filter screen. When empty, water flow was started into the bottom of the bed at 50 liters per minute. Water was passed through the bed from bottom to top for 202 minutes. A total of 10,100 kilograms of water was used, which is 19 kilograms of water per kilogram of dry polymer. Aqueous 36 percent hydrochloric acid was added to the water and polymer in the extractor to form a 1.3 percent aqueous hydrochloric acid solution in contact with the polymer. The extractor was sparged with nitrogen from the bottom to mix the polymer and acid solution. After soaking for 120 minutes, the acid solution was drained from the bottom of the extractor through the filter screen. Water was passed through the polymer bed from top to bottom at a rate of 60 liters per minute for 138 minutes to remove greater than 99 weight percent of the hydrochloric acid.

About 0.85 kilograms of steam per kilogram of polyetherketone was then passed through the extractor for 50 minutes, resulting in removal of about 40 weight percent of the water. The pressure within the extractor was reduced to about 200 torr for about 2 hours. The polymer was then removed from the extractor by opening a valve at the bottom of the conical section and discharging into bags. The polymer was a free flowing solid not requiring the use of a mechanical conveying system.

The process of this invention is typically practiced in a batch mode although it is within the scope of the invention to practice the process on a continuous basis.

A particularly important advantage of the process of this invention is the physical form of the product. The process of this invention produces a particulate product which is flowable and therefore does not require the use of expensive mechanical conveyors.

We claim:

1. A process comprising:
   (A) introducing into an extraction zone a Lewis acid polymerization catalyst selected from the group consisting of aluminum chloride, boron trifluoride, antimony pentaflouoride and ferric chloride, a polymerization solvent selected from the group consisting of o-dichlorobenzene and diphenylether and a polyetherkitone which has an inherent viscosity of at least 0.2 and corresponds to the structure

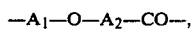

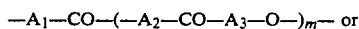 or

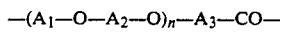

wherein m is 1, 2 or 3, n is 1, 2 or 3, and $A_1$, $A_2$ and $A_3$ correspond to the structure

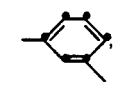

(B) passing an alcohol selected from the group consisting of methanol, ethanol, n-propanol and iso-propanol through the extraction zone to remove from the extraction zone greater than 98 weight percent of the Lewis acid catalyst and greater than 98 weight percent of the polymerization solvent,
   (C) passing water through the extraction zone in a direction opposite to the direction the alcohol was passed through the extraction zone to remove greater than 95 weight percent of the alcohol from the extraction zone,
   (D) contacting the polyetherketone within the extraction zone with a hydrochloric acid containing aqueous solution having a Ph of less than 3 for at least 120 minutes,
   (E) passing water through the extraction zone to remove greater than 98 weight percent of the acid from the extraction zone,
   (F) passing at 0.8 to 1.7 pounds of steam per pound of polyetherketone through the extraction zone for at least 70 minutes to remove at least 35 weight percent of the water, and
   (G) subjecting the polyetherketone within the extraction zone to a pressure of about 200 Torr for at least 3 hours.

2. The process of claim 1 wherein the polyetherketone corresponds to the structure

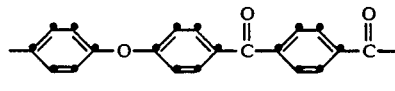

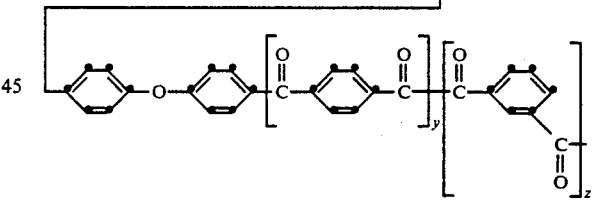

wherein the ratio of y:z is in the range of 90:10 to 25:75.

3. The process of claim 2 wherein the ratio of y:z is in the range of 80:20 to 60:40.

4. The process of claim 1 wherein the alcohol is methanol.

5. The process of claim 1 wherein the Lewis catalyst polymerization catalyst is aluminum chloride.

* * * * *